(12) United States Patent
Brown et al.

(10) Patent No.: US 11,465,777 B2
(45) Date of Patent: Oct. 11, 2022

(54) METHOD OF SERVICING AN AIRCRAFT LANDING GEAR SHOCK ABSORBING STRUT

(71) Applicant: Safran Landing Systems UK LTD, Gloucester (GB)

(72) Inventors: Adam Brown, Gloucester (GB); Jon Smith, Gloucester (GB)

(73) Assignee: Safran Landing Systems UK LTD

( * ) Notice: Subject to any disclaimer, the term of this patent is extended or adjusted under 35 U.S.C. 154(b) by 940 days.

(21) Appl. No.: 16/214,237

(22) Filed: Dec. 10, 2018

(65) Prior Publication Data

US 2019/0177009 A1 Jun. 13, 2019

(30) Foreign Application Priority Data

Dec. 13, 2017 (EP) ..................................... 17207026

(51) Int. Cl.
| | |
|---|---|
| *B64F 5/40* | (2017.01) |
| *F16F 9/32* | (2006.01) |
| *F16F 9/06* | (2006.01) |
| *F16F 9/43* | (2006.01) |
| *B64C 25/60* | (2006.01) |
| *B64C 25/00* | (2006.01) |

(52) U.S. Cl.
CPC ................ *B64F 5/40* (2017.01); *B64C 25/60* (2013.01); *F16F 9/06* (2013.01); *F16F 9/061* (2013.01); *F16F 9/3271* (2013.01); *F16F 9/3292* (2013.01); *F16F 9/435* (2013.01); *B64C 25/00* (2013.01); *F16F 2222/12* (2013.01); *F16F 2230/0047* (2013.01); *F16F 2230/06* (2013.01); *F16F 2230/46* (2013.01)

(58) Field of Classification Search
CPC .. B64F 5/40; B64C 25/60; B64C 25/00; F16F 9/06; F16F 9/061; F16F 9/3271; F16F 9/3292; F16F 9/435; F16F 2222/12; F16F 2230/0047; F16F 2230/06; F16F 2230/46
See application file for complete search history.

(56) References Cited

U.S. PATENT DOCUMENTS

| | | | |
|---|---|---|---|
| 3,747,913 A | 7/1973 | Savery | |
| 2015/0267769 A1* | 9/2015 | Fazeli | .................. G07C 5/0816 701/29.5 |

FOREIGN PATENT DOCUMENTS

| | | |
|---|---|---|
| CH | 224115 A | 10/1942 |
| EP | 2937592 A2 | 10/2015 |
| EP | 3118110 A1 | 1/2017 |

(Continued)

OTHER PUBLICATIONS

European Search Report for European Application No. 17 207 026.0, dated Jun. 18, 2018—8 pages.

(Continued)

*Primary Examiner* — Yuen Wong
(74) *Attorney, Agent, or Firm* — RatnerPrestia

(57) ABSTRACT

A method of servicing a shock absorber of an aircraft landing gear shock absorbing strut, the shock absorber including a sealed, variable volume chamber containing a liquid and a gas in fluid communication with one another, the method comprising: using a mixer to mix the liquid and the gas within the chamber until the liquid is uniformly saturated with the gas; and subsequently performing one or more servicing actions.

21 Claims, 2 Drawing Sheets

(56) References Cited

FOREIGN PATENT DOCUMENTS

| EP | 3165469 A1 | 5/2017 |
|---|---|---|
| WO | 2014184521 A1 | 11/2014 |

OTHER PUBLICATIONS

European Communication Pursuant to Article 94(3) EPC for European Application No. 17 207 026.0, dated Mar. 25, 2020, 6 pages.

* cited by examiner

METHOD OF SERVICING AN AIRCRAFT LANDING GEAR SHOCK ABSORBING STRUT This application claims the benefit of and priority to European Patent Application No. EP 17207026.0, filed on Dec. 13, 2017, the contents of which are incorporated herein by reference.

BACKGROUND

An aircraft landing gear shock absorbing strut is a structural assembly arranged to carry the weight of the aircraft when on the ground, and also absorb landing loads. A major component of an aircraft landing gear shock absorbing strut is therefore a shock absorber.

The shock absorber can be pressurized to achieve a particular shock absorber extension length, specific to a type of aircraft. This pressurization level is calculated using the weight of the aircraft, the ambient temperature around the aircraft and static design spring curves.

A known type of shock absorber contains a generally incompressible liquid, such as oil, for damping purposes as well as an elastic gas, such as nitrogen or helium, for spring purposes.

In some cases the liquid and gas are separated within the shock absorber, for example by a separator piston.

In some other cases the liquid and gas are unseparated i.e. free to mix within the shock absorber. Such a shock absorber will be referred to as an "unseparated" shock absorber.

The present inventors have devised a new method of servicing an unseparated shock absorber, which can enable the shock absorber to be serviced while the strut, of which it forms a part, is supporting the weight of the aircraft on the ground. The new method can also result in a faster service time and/or can be simpler than known servicing methods and/or increase the accuracy of servicing actions performed.

This description of the background is provided to assist with an understanding of the following explanations of exemplary embodiments, and is not an admission that any or all of this background information is necessarily prior art.

SUMMARY

According to a first aspect of the invention, there is provided a method of servicing an unseparated shock absorber of an aircraft landing gear shock absorbing strut, the shock absorber including a sealed, variable volume chamber containing a liquid and a gas, the method comprising: using a mixer to mix the liquid and the gas within the chamber until the liquid is uniformly saturated with the gas; and subsequently performing one or more servicing actions.

Thus, the method according to the first aspect of the invention enables the working fluid within the shock absorber to be set in a known, equilibrium state for servicing, where the entire liquid volume is fully saturated with the gas and so the amount of gas dissolved in the liquid can be more easily determined. This is advantageous over known methods in which the liquid is in an unknown, partially saturated condition.

The steps of using the mixer and performing one or more servicing actions can be carried out while the shock absorbing strut is carrying the weight of the aircraft, optionally with the weight of the aircraft being fully supported by the shock absorbing strut throughout the process.

Thus, the method can result in a faster, simpler servicing procedure in comparison to known methods which require the aircraft to be jacked up to remove weight from the wheel(s) of the shock absorbing strut. The method can increase the accuracy of servicing actions performed in comparison to a method not in accordance with the invention in which an unseparated shock absorber is serviced without jacking the aircraft.

Performing one or more servicing actions can comprise performing one or more first servicing measurements.

The one or more first servicing measurements can comprise measuring the pressure within the chamber.

The one or more first servicing measurements can comprise measuring the temperature within the chamber.

The one or more first servicing measurements can comprise measuring the length of the shock absorber.

After the step of performing one or more first servicing measurements, the step of performing one or more servicing actions can comprise a step of performing one or more first servicing operations.

The one or more first servicing operations can comprise adding gas to the chamber or removing gas from the chamber.

After the step of performing one or more first servicing measurements, the step of performing one or more servicing actions can comprise modifying the load carried by the shock absorber and performing one or more second servicing measurements.

The second servicing measurements can be the same types of servicing measurements as the first servicing measurements.

After the step of performing one or more second servicing measurements, the step of performing one or more servicing actions can comprise a step of performing one or more second servicing operations.

The one or more second servicing operations can comprise adding liquid to the chamber or removing liquid from the chamber.

The step of mixing using a mixer can comprise drawing liquid from a lower region of the chamber into a pumping unit and forcing the withdrawn liquid into an upper region of the chamber to spray the withdrawn liquid into the chamber.

Alternatively, the step of mixing using a mixer can comprise operating an impeller mounted for rotation within the chamber to mix the liquid and the gas within the chamber.

The liquid can comprise oil.

The gas can comprise nitrogen and/or helium.

According to a second aspect of the invention, there is provided aircraft landing gear shock absorbing strut servicing apparatus comprising: an aircraft landing gear shock absorbing strut comprising an unseparated shock absorber, the shock absorber including a sealed, variable volume chamber containing a liquid and a gas; and a mixer provided in fluid communication with the inside of the chamber and arranged to mix the liquid and the gas until the liquid is uniformly saturated with the gas.

Optional features of the first aspect can be applied to the second aspect in an analogous manner.

The mixer can comprise a pump device external to the shock absorber and including a first hose coupled to a first port through a lower end of the shock absorber to as to provide fluid communication with a lower region of the chamber and a second hose coupled to a second port through an upper end of the shock absorber to as to provide fluid communication with an upper region of the chamber. The pumping device can be arranged to draw liquid from chamber via the first hose and feed liquid back into the chamber via the second hose. The second port can be arranged with a plurality of apertures or flow diverting formations such as protrusions to cause the liquid to be sprayed into the chamber.

The mixer can comprise an impeller mounted for rotation within the chamber, preferably within a lower region of the chamber, and an electric motor arranged to drive the impeller, the motor being sealed within a liquid tight enclosure and either being provided with a dedicated battery or including a power cable extending from the motor to a port on the exterior of the shock absorber for coupling to an external power supply.

BRIEF DESCRIPTION OF THE DRAWINGS

Embodiments of the Invention will now be described with reference to the accompanying drawings, in which.

DETAILED DESCRIPTION

Figure 1:
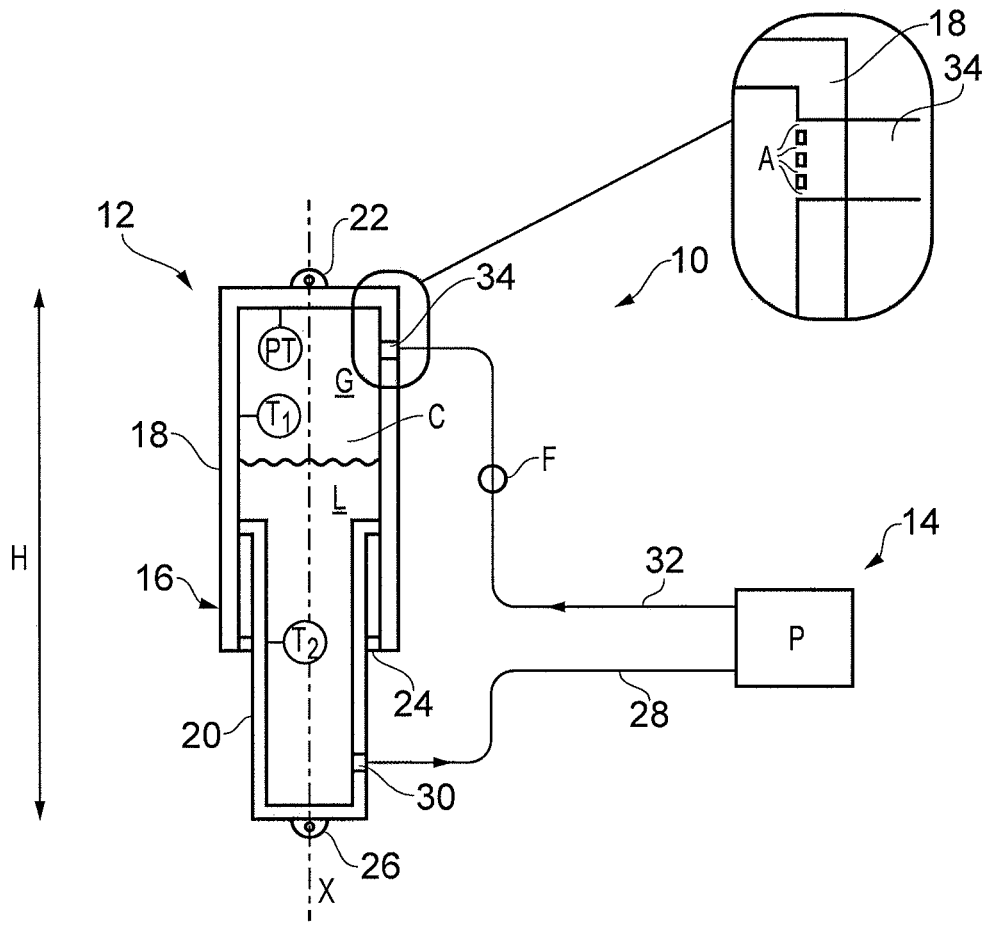
FIG. 1 is a diagram of an aircraft landing gear shock absorbing strut servicing apparatus according to an embodiment of the invention.

FIG. 1 shows an aircraft landing gear shock absorbing strut servicing apparatus according to an embodiment of the invention generally at 10.

The servicing apparatus 10 includes an aircraft landing gear shock absorbing strut 12 and a mixer 14.

The aircraft landing gear shock absorbing strut 12 can take any suitable form including an "unseparated" shock absorber 16, containing a liquid and a gas in fluid communication with one another and not separated by a movable barrier such as a separator piston.

In this embodiment the shock absorber 16 defines the main structural load bearing assembly of the shock absorbing strut 12, with an upper cylinder 18 of the shock absorber 16 defining the main fitting for pivotally coupling to an airframe (not shown) via a main hinge 22. A sliding tube 20 is slidably mounted within the outer cylinder 18 for linear movement along axis X between extending and compressed conditions. The cylinder 18 and sliding tube 20 are hollow so as to collectively define a variable volume chamber C containing a liquid L and a gas G. The chamber C is sealed by dynamic seals 24. A lower end of the sliding tube 20 is provided with a ground contacting assembly coupling 26 for coupling to a wheel assembly, bogie beam or the like (not shown).

For the following description the liquid L is oil and the gas G is nitrogen, but other liquids and gasses can be used.

Due to the effects of nitrogen dissolving and coming out of solution within an unseparated shock absorber, determining the correct oil and nitrogen quantities can be difficult in a weight-on-wheels situation, where the shock absorbing strut is carrying the weight of the aircraft.

While the gas G and liquid L can remain substantially unmixed in an unseparated shock absorber, some gas will dissolve in the liquid. The variation of volume of the liquid L due changes in temperature and pressure is significantly smaller than the variation of gas G and can therefore be assumed to remain generally constant regardless of temperature, pressure and the amount of gas G dissolved in the liquid L. However, the volume of gas G can be relatively heavily dependent on temperature, pressure and the amount of gas G dissolved in the liquid L.

While the temperature and pressure of a gas can be readily determined or estimated, the amount of gas G dissolved in the liquid L cannot.

During landing, the increase in pressure and rapid flow of oil generated causes nitrogen to dissolve in the oil. However the amount of nitrogen that dissolves in the oil can vary depending on the landing conditions from a little to a moderate amount.

Depending on how much nitrogen has dissolved in the oil, the remaining shock absorber stroke along axis X will vary for the same shock absorber pressure, making any assessment of the shock absorber length H potentially prone to error. As a result, nitrogen may be unnecessarily added during a service known servicing method. This can lead to an increased pressure in the shock absorber as nitrogen comes out of solution during flight, which in turn can compromise the landing performance of the shock absorber strut. In particular, it can increase the breakout load of the shock absorber strut, which can have a detrimental impact on 'weight on wheel' indication performance.

In view of this, some landing gear are not permitted to be serviced with the aircraft in the weight on wheels condition. In order to service such a landing gear using known methods it is necessary to jack the aircraft, which can lead to a time consuming and difficult servicing procedure.

By way of a non-limiting overview, the present inventors have devised a servicing method in which the mixing device 14 is used to mix the oil and nitrogen until the oil is uniformly saturated with the nitrogen. The amount of nitrogen which is dissolved in a situation where the oil is saturated can be determined from empirical data and so this provides a known state from which to perform subsequent servicing actions such as measurements and operations.

In the illustrated example the mixing device 14 is a pump P located external to the shock absorber 16 and including a first hose 28 coupled to a first port 30 through a lower end of the shock absorber 16 to as to provide fluid communication with a lower region of the chamber C, where oil will gather due to gravity. The mixing device 14 also includes a second hose 32 coupled to a second port 34 through an upper end of the shock absorber so as to provide fluid communication with an upper region of the chamber, where nitrogen will settle. The pumping P is arranged to draw oil from chamber C via the first hose 28 and feed the oil back into the chamber C via the second hose 32. Preferably the second port 34 is arranged with a plurality of apertures A or flow diverting formations such as protrusions to cause the oil to be sprayed into the chamber. The hoses 28, 32 can each include a temperature transducer (not shown) to measure the temperature of fluid passing through the hoses 28, 32. The pump P can be configured to circulate the oil with a flow rate of, for example around 11 liters per minute with the pump running at 50 Hz. An inverter drive (not shown) can be provided to enable the frequency and thus flow rate to be varied. The flow rate can be measured by a flow meter F. It is preferred that the pump is gear pump with positive displacement so that the speed of rotation of the pump motor enables the flow rate to be known.

Alternatively, the pump P can be located within the chamber C. In such embodiments the pump P and any driving motor can be provided within a sealed unit to enable it to be submerged and operate in a high pressure environment.

Measurements can be taken using, for example, a pressure transducer PT arranged to measure the fluid pressure within the chamber C and temperature transducers T1, T2 arranged respectively within the upper and lower regions of the chamber C to measure respectively the temperature of the nitrogen and the temperature of the oil.

Figure 2:
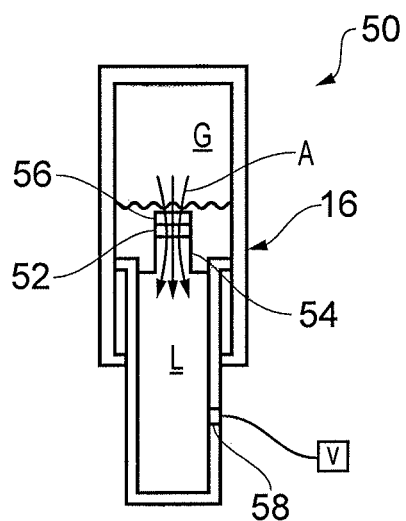
FIG. 2 is a diagram of an aircraft landing gear shock absorbing strut servicing apparatus according to an embodiment of the invention.

An alternative embodiment of an aircraft landing gear shock absorbing strut servicing apparatus 50 is shown in FIG. 2, which is similar to the apparatus 10 of FIG. 1 except that the mixer in this embodiment comprises an impeller 52 mounted via a bracket 54 for rotation within the chamber, preferably within a lower region of the chamber i.e. the region that contains oil. The impeller 22 can be driven by an electric motor 56, the motor being sealed within a liquid tight enclosure and either being provided with a dedicated battery or including a power cable extending from the motor to a port 58 on the exterior of the shock absorber for coupling to an external power supply V. When operated, the impeller 52 drives the oil and nitrogen in the direction of arrows A to mix the two.

In any embodiment, for a given shock absorber configuration the mixer can be operated for a length of time determined by simple testing to determine a time duration that will result in the liquid being uniformly saturated with the gas. In a constant volume condition the pressure will reduce until it reaches a stable pressure. In a constant load (pressure) condition the stroke of the shock absorber will reduce until it reaches a stabilized condition. Given the benefit of the present disclosure, it will be apparent to the skilled person that "uniformly saturated" can mean that the liquid contains at least 90% of the mass of the gas which would be contained in a saturated state at the same temperature and pressure, i.e. is at least 90% saturated and preferably at least 95% and more preferably at least 99% saturated. A greater degree of saturation can increase the accuracy of servicing actions performed.

Figure 3:
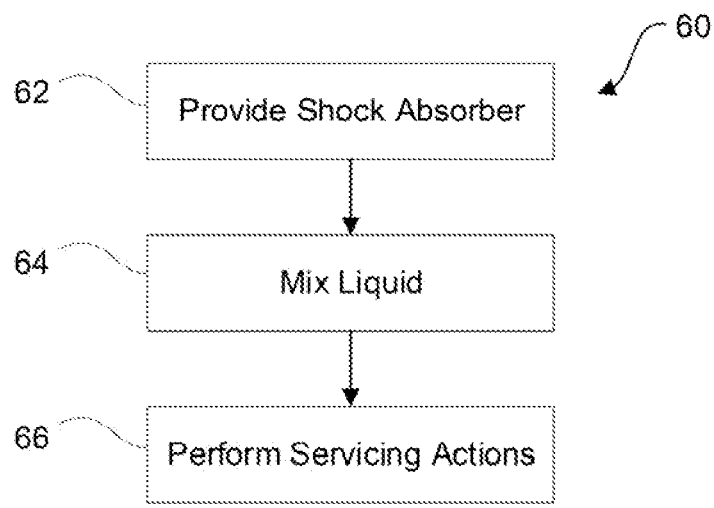
FIG. 3 is a flow chart of a method according to an embodiment of the invention.

FIG. 3 is a flow chart illustrating a method 60 according to an embodiment of the invention.

At step 62 an unseparated shock absorber of an aircraft landing gear shock absorbing strut is provided. The shock absorber includes a sealed, variable volume chamber containing a liquid and a gas.

At step 64 a mixer is used to mix the liquid and the gas within the chamber until the liquid is uniformly saturated with the gas.

At step 66 one or more servicing actions are subsequently performed.

Steps 64 and 66 can be carried out while the shock absorbing strut is carrying the weight of the aircraft, optionally with the weight of the aircraft being fully supported by the shock absorbing strut throughout the process. Thus, the method can result in a faster, simpler servicing procedure in comparison to known methods which require the aircraft to be Jacked up to remove weight from the wheel(s) of the shock absorbing strut.

Figure 4:
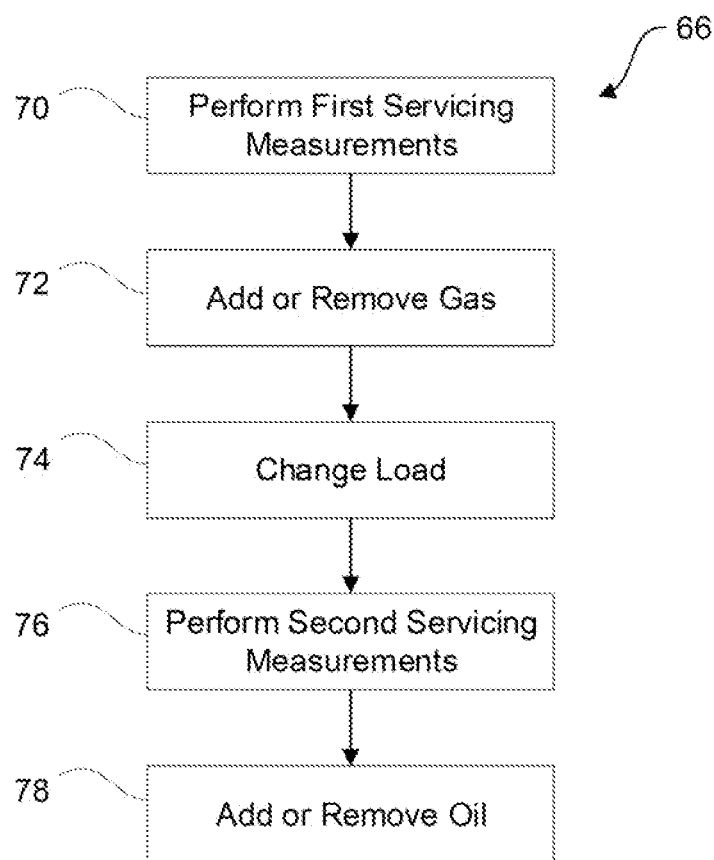
FIG. 4 is a flow chart of possible servicing actions within the method of FIG. 3.

FIG. 4 is a flow chart illustrating servicing actions of step 66 in an embodiment of the invention.

At step 70 a plurality of first servicing measurements are made, which can comprise measuring the pressure within the chamber, measuring the temperature of the oil and nitrogen within the chamber and measuring the length of the shock absorber.

At step 72, gas can be added to the chamber, or removed from the chamber, as necessitated by the first servicing measurements.

At step 74, the load carried by the shock absorber can be varied, for example by Jacking the aircraft to reduce or remove the weight from wheels.

At step 76 a plurality of second servicing measurements are made, which can comprise measuring the pressure within the chamber, measuring the temperature of the oil and nitrogen within the chamber and measuring the length of the shock absorber.

At step 78, oil can be added to the chamber, or removed from the chamber, as necessitated by the second servicing measurements in view of the first servicing measurements.

It will be appreciated however that other methods according to embodiments of the invention can comprise some of the steps, measurements and actions as described above.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A method of servicing a shock absorber of an aircraft landing gear shock absorbing strut, the shock absorber including a sealed, variable volume chamber containing a liquid and a gas in fluid communication with one another, the method comprising:
    using a mixer to mix the liquid and the gas within the sealed, variable volume chamber until the liquid contains at least a predetermined percentage of mass of the gas in a saturated state at the same temperature and pressure; and
    subsequently performing one or more servicing actions.

2. The method according to claim 1, wherein the steps of using the mixer and performing one or more servicing actions are carried out while the shock absorbing strut is carrying a weight of the aircraft.

3. The method according to claim 1, wherein the step of performing one or more servicing actions comprises performing one or more first servicing measurements.

4. The method according to claim 3, wherein the one or more first servicing measurements comprises measuring the pressure within the sealed, variable volume chamber and/or measuring the temperature within the sealed, variable volume chamber and/or measuring a length of the shock absorber.

5. The method according to claim 4, wherein after the step of performing one or more first servicing measurements, the step of performing one or more servicing actions comprises a step of performing one or more first servicing operations.

6. The method according to claim 5, wherein the one or more first servicing operations comprises adding an additional quantity of gas to the sealed, variable volume chamber or removing a portion of the gas from the sealed, variable volume chamber.

7. The method according to claim 5, wherein the one or more first servicing operations comprises modifying a load carried by the shock absorber and performing one or more second servicing measurements.

8. The method according to claim 7, wherein the one or more second servicing measurements comprises measuring the pressure within the sealed, variable volume chamber and/or measuring the temperature within the sealed, variable volume chamber and/or measuring the length of the shock absorber.

9. The method according to claim 8, wherein after the step of performing one or more second servicing measurements, the step of performing one or more servicing actions comprises a step of performing one or more second servicing operations.

10. The method according to claim 9, wherein the one or more second servicing operations comprises adding an additional quantity of liquid to the sealed, variable volume chamber or removing a portion of the liquid from the sealed, variable volume chamber.

11. The method according to claim 1, wherein the step of mixing using a mixer comprises withdrawing a quantity of the liquid from a lower region of the sealed, variable volume chamber into a pumping unit and forcing the withdrawn quantity of the liquid into an upper region of the sealed, variable volume chamber to spray the withdrawn quantity of the liquid into the sealed, variable volume chamber.

12. An aircraft landing gear shock absorbing strut servicing apparatus comprising:
    an aircraft landing gear shock absorbing strut comprising an shock absorber, the shock absorber including a sealed, variable volume chamber containing a liquid and a gas in fluid communication with one another; and
    a mixer provided in fluid communication with an inside of the sealed, variable volume chamber and configured to mix the liquid and the gas until the liquid contains at least a predetermined percentage of mass of the gas in a saturated state at the same temperature and pressure.

13. The aircraft landing gear shock absorbing strut servicing apparatus according to claim 12, wherein the mixer comprises a pump device external to the shock absorber and including a first hose coupled to a first port through a lower end of the shock absorber to provide fluid communication with a lower region of the sealed, variable volume chamber and a second hose coupled to a second port through an upper end of the shock absorber to provide fluid communication with an upper region of the sealed, variable volume chamber.

14. The aircraft landing gear shock absorbing strut servicing apparatus according to claim 13, wherein the second port is arranged to disrupt a flow of liquid entering the shock absorber to form a spray of liquid into the sealed, variable volume chamber.

15. The aircraft landing gear shock absorbing strut servicing apparatus according to claim 12, wherein the mixer comprises an impeller mounted for rotation within the sealed, variable volume chamber and an electric motor arranged to drive the impeller, the electric motor being sealed within a liquid tight enclosure.

16. The method according to claim 1, wherein the predetermined percentage of mass of the gas is at least 90%.

17. The method according to claim 1, wherein the predetermined percentage of mass of the gas is at least 95%.

18. The method according to claim 1, wherein the predetermined percentage of mass of the gas is at least 99%.

19. The aircraft landing gear shock absorbing strut servicing apparatus according to claim 12, wherein the predetermined percentage of mass of the gas is at least 90%.

20. The aircraft landing gear shock absorbing strut servicing apparatus according to claim 12, wherein the predetermined percentage of mass of the gas is at least 95%.

21. The aircraft landing gear shock absorbing strut servicing apparatus according to claim 12, wherein the predetermined percentage of mass of the gas is at least 99%.

* * * * *